United States Patent
Bourderionnet et al.

(10) Patent No.: US 10,126,559 B2
(45) Date of Patent: Nov. 13, 2018

(54) SYSTEM FOR SPATIAL RECOMBINATION OF ULTRASHORT LASER PULSES BY MEANS OF A DIFFRACTIVE ELEMENT

(71) Applicant: THALES, Courbevoie (FR)

(72) Inventors: Jérôme Bourderionnet, Palaiseau (FR); Arnaud Brignon, Palaiseau (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/313,028

(22) PCT Filed: May 26, 2015

(86) PCT No.: PCT/EP2015/061536
§ 371 (c)(1),
(2) Date: Nov. 21, 2016

(87) PCT Pub. No.: WO2015/181137
PCT Pub. Date: Dec. 3, 2015

(65) Prior Publication Data
US 2017/0199390 A1    Jul. 13, 2017

(30) Foreign Application Priority Data
May 28, 2014 (FR) .................................. 14 01219

(51) Int. Cl.
| | |
|---|---|
| *H01S 3/10* | (2006.01) |
| *G02B 27/10* | (2006.01) |
| *H01S 3/23* | (2006.01) |
| *H01S 3/00* | (2006.01) |
| *H01S 3/08* | (2006.01) |
| *H01S 3/082* | (2006.01) |

(52) U.S. Cl.
CPC .......... *G02B 27/1086* (2013.01); *H01S 3/005* (2013.01); *H01S 3/08009* (2013.01); *H01S 3/10* (2013.01); *H01S 3/2383* (2013.01); *H01S 3/0826* (2013.01)

(58) Field of Classification Search
CPC ....... G02B 27/09; G02B 27/0905; H01S 3/10; H01S 3/2383; H01S 3/08009
USPC ............. 359/562, 573; 372/6, 26, 18, 50.11, 372/50.12, 50.122
See application file for complete search history.

(56) References Cited

U.S. PATENT DOCUMENTS

| | | | |
|---|---|---|---|
| 6,570,896 B2 * | 5/2003 | Bissinger ............... | G02B 27/09 372/26 |
| 7,924,894 B2 * | 4/2011 | Livingston ............ | H01S 3/2308 372/26 |
| 8,179,594 B1 | 5/2012 | Tidwell et al. | |
| 2011/0305250 A1 * | 12/2011 | Chann ................ | G02B 27/0905 372/6 |

FOREIGN PATENT DOCUMENTS

DE    10 2010 033630 A1    2/2011

* cited by examiner

*Primary Examiner* — Audrey Y Chang
(74) *Attorney, Agent, or Firm* — Baker & Hostetler LLP

(57) ABSTRACT

A system based on recombination by superposition using a diffractive optical element DOE to combine the beams is provided. An optical diffractive assembly is placed upstream of a diffractive optical element to make it possible, via an appropriate imaging system, to optimize the combining efficiency in the ultra-short pulse regime.

8 Claims, 10 Drawing Sheets

SYSTEM FOR SPATIAL RECOMBINATION OF ULTRASHORT LASER PULSES BY MEANS OF A DIFFRACTIVE ELEMENT

CROSS-REFERENCE TO RELATED APPLICATIONS

This application is a National Stage of International patent application PCT/EP2015/061536, filed on May 26, 2015, which claims priority to foreign French patent application No. FR 1401219, filed on May 28, 2014, the disclosures of which are incorporated by reference in their entirety.

FIELD OF THE INVENTION

The field of the invention is that of the coherent recombining of a large number of ultra-short pulse laser sources, that is to say with pulse width of less than a picosecond. The framework of the invention relates to the technique of the spatial recombining of these laser pulses, assumed to be perfectly synchronized otherwise.

BACKGROUND

Coherent recombination of ultra-short pulse laser sources applies notably to the realization of high-energy laser sources.

Methods for spatially recombining coherent beams fall into 2 categories, depending on whether one chooses to juxtapose the optical beams in the far field or to superpose them in the near field, that is to say at the level of the exit pupil of the system.

A system for recombining by juxtaposition is shown in FIG. 1a. In this case, the beams to be recombined, arising from laser sources $F_k$, k varying from 0 to N, are parallel and collimated in the near field by an array of collimating lenses MLC, and are disposed alongside one another, in the most compact manner possible. The superposition of the beams is then performed by free propagation up to the far field. Such a system does not involve any dispersive hardware components and therefore applies equally for pulse widths of less than a picosecond. However, the major drawback of this system is its relatively low efficiency, with notably an appreciable share of the energy lost in the grating lobes.

In the case of a near-field superposition system, it is for example possible to recombine the optical beams by using the polarization of the electromagnetic field: the optical beams arising from the laser sources $F_k$ and collimated by collimating lenses $CL_k$ are superposed in the near field by means of polarization-splitter cubes $PBS_k$ respectively associated with half-wave plates $HWP_k$, as illustrated by the example of FIG. 1b. According to this system the recombining efficiency for N beams is given by:

$$Eff = \frac{1}{N}\left(\eta^{N-1} + \sum_{k=1}^{N-1} \eta^k\right)$$

where η is the coefficient of transmission of each pair (polarization-splitter cube/half-wave plate). The advantage of this architecture is its relative simplicity of implementation for a reduced number of beams to be recombined: typically about ten at the maximum. For a large number of beams, on the one hand the implementation of the system becomes very complex, and on the other hand, the recombining efficiency drops rapidly with the number of sources (for η=99%, the efficiency drops to 10% for 1000 recombined beams).

Whether involving recombination in the far field by free propagation of collimated and parallel beams, or superposition of the near-field beams by using a splitter plate or a polarization-splitter cube, none of these systems is suitable for recombining a large number of pulses (typically >100 or indeed 1000), i.e. due to problems of efficiency (grating lobes for the far-field device), or of implementation for near-field systems.

Another technique for recombining by superposition uses a diffractive optical element to combine the beams. According to this technique illustrated in FIG. 1c, a lens 23 in a Fourier-transform setup makes it possible to collimate the beams to be recombined (arising from the laser sources $F_k$) and to direct them toward a diffractive optical element or DOE 1 situated in the focal plane of the lens 23. The spatial distribution of the source points in the object plane A of the lens 23 (periodic distribution of period $P_A$) is transformed into a distribution of angles of incidence on the optical element DOE 1. The optical element 1 is typically a periodic phase grating, for example of Damann grating type, which ensures the constructive interference of all the incident beams on the order 0, and destructive on all the other orders; the period Λ of this grating and the angles of incidence $\theta_{2k}$ are related by the known formula for diffraction gratings:

$$\sin(\theta_{2k}) = k \times \frac{\lambda_0}{\Lambda}$$

The advantages of this architecture are notably a high efficiency (beyond 90% demonstrated in the continuous regime), and an architecture that is well suited to a very large number of beams (typically >100) on account of this collective positioning, of a possible two-dimensional arrangement, and of the use of a single lens. On the other hand, this technique may not apply as is in the ultra-short pulse regime.

The technical problem to be solved consists in transferring as efficiently as possible the energy of each of the laser pulses to a single pulse by a coherent process, while degrading the beam quality of the final pulse as little as possible with respect to the elementary pulses, while being compatible with a large number of summed pulses, and also sub-picosecond pulse duration.

The proposed solution is based on recombination by superposition using a diffractive optical element DOE to combine the beams. According to the invention, an optical diffractive assembly is placed upstream of this diffractive optical element so as to make it possible, via an appropriate imaging system, to optimize the combining efficiency in the ultra-short pulse regime.

SUMMARY OF THE INVENTION

More precisely the subject of the invention is a system for the spatial recombining of pulse laser beams of the same wavelength centered around $\lambda_0$, arising from N synchronized sources k, k varying from 1 to N, N being an integer >1, which has an optical axis and comprises:

a Fourier lens of focal length $f_2$, of predefined object plane and predefined image plane, the laser beams exhibiting at $\lambda_0$ a periodic spatial configuration of spacing $P_A$, in the object plane (plane A), a recombining diffractive optical element with periodic phase profile, on which the N beams are intended to be directed by the Fourier lens according to an angle of incidence $\theta_{2k}$ that differs from one beam to the next, these angles of incidence being determined as a function of the period of the recombining diffractive optical element.

It is mainly characterized in that the sources are able to emit pulses of duration of less than $10^{-12}$ s, and in that it comprises:

N compensating diffractive optical elements (DOEs) with periodic grating with one compensating diffractive optical element per source, an angle of incidence $\theta_{1k}$ that differs from one beam to the next, and a grating spacing $\Lambda_{1k}$ that differs between neighboring compensating diffractive optical elements, an array of lenses with one lens per source, of predefined object plane and predefined image plane, forming with the Fourier lens a double-FT setup of predetermined magnification γ, able to image each compensating diffractive optical element on the recombining diffractive optical element, the compensating DOE being situated in the object plane of the array of lenses, the recombining DOE being situated in the image plane of the Fourier lens, the image plane of the array of lenses coinciding with the object plane of the Fourier lens, and in that for each compensating DOE, the angle of incidence $\theta_{1k}$ of the beam on the compensating DOE, the angle of inclination $\Theta_k$ of the compensating DOE on the optical axis, and the spacing $\Lambda_{1k}$ of its grating, are determined on the basis of the spacing $P_A$, of k, of $\lambda_0$, of the magnification γ, of the focal length $f_2$ and of the period of the recombining diffractive optical element.

According to one embodiment of the invention, the angles of inclination $\Theta_k$ of the compensating DOEs are zero, the DOEs being situated in one and the same plane.

The sources can be disposed according to a one-dimensional or two-dimensional spatial configuration.

Preferably, the compensating DOE gratings are blazed gratings.

According to a characteristic of the invention, the beams arising from the laser sources have one and the same exit plane, and the system comprises another Fourier lens having an object plane in which the exit plane of the laser sources and an image plane of the laser sources is situated. The position of the image plane of this lens with respect to the plane in which the assembly of the compensating diffractive optical elements is situated, as well as the separation of the sources in the object plane of the lens, are determined as a function of the focal length of the Fourier lens, of the period $P_A$, and of the angles $\theta_{1k}$.

BRIEF DESCRIPTION OF THE DRAWINGS

Other characteristics and advantages of the invention will become apparent on reading the detailed description which follows, given by way of nonlimiting example and with reference to the appended drawings in which.

From one figure to the next, the same elements are tagged by the same references.

The description is given with reference to the orientation of the figures described. Insofar as the system can be positioned according to other orientations, the directional terminology is indicated by way of illustration and is not limiting.

DETAILED DESCRIPTION

Figure 2A:
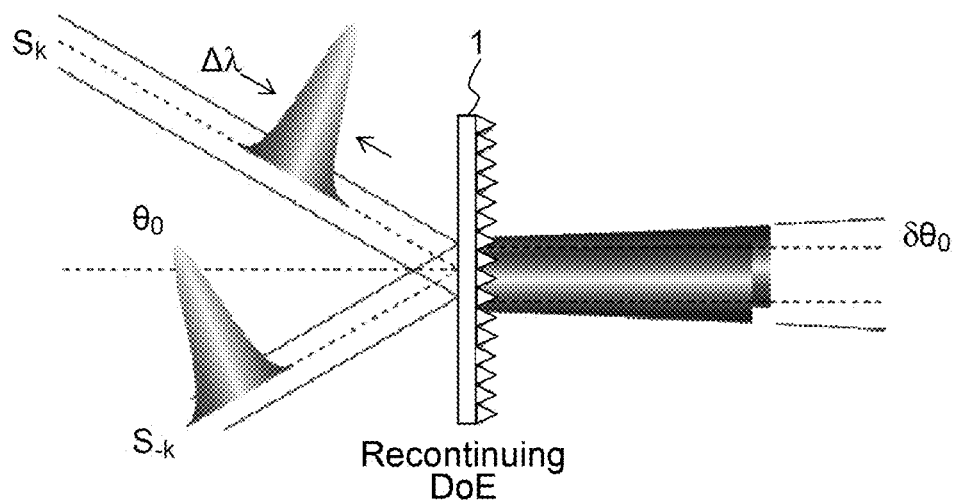
Figure 2B:
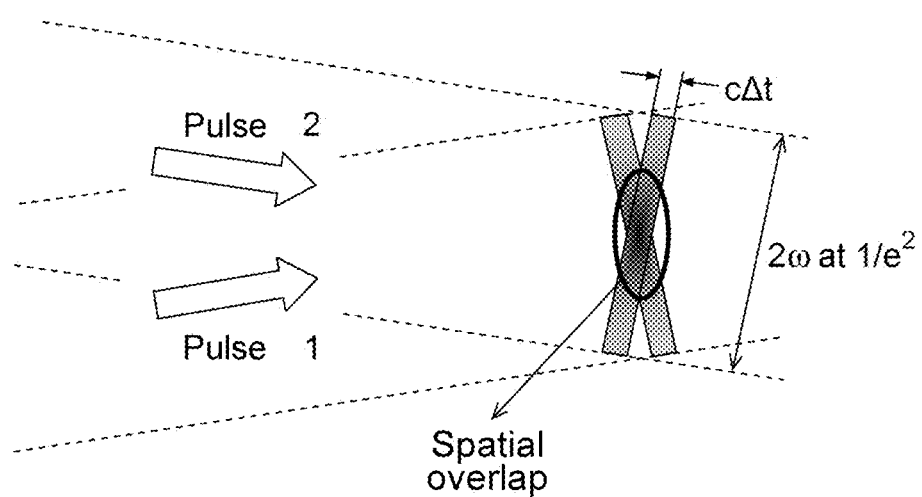
Figure 2C:
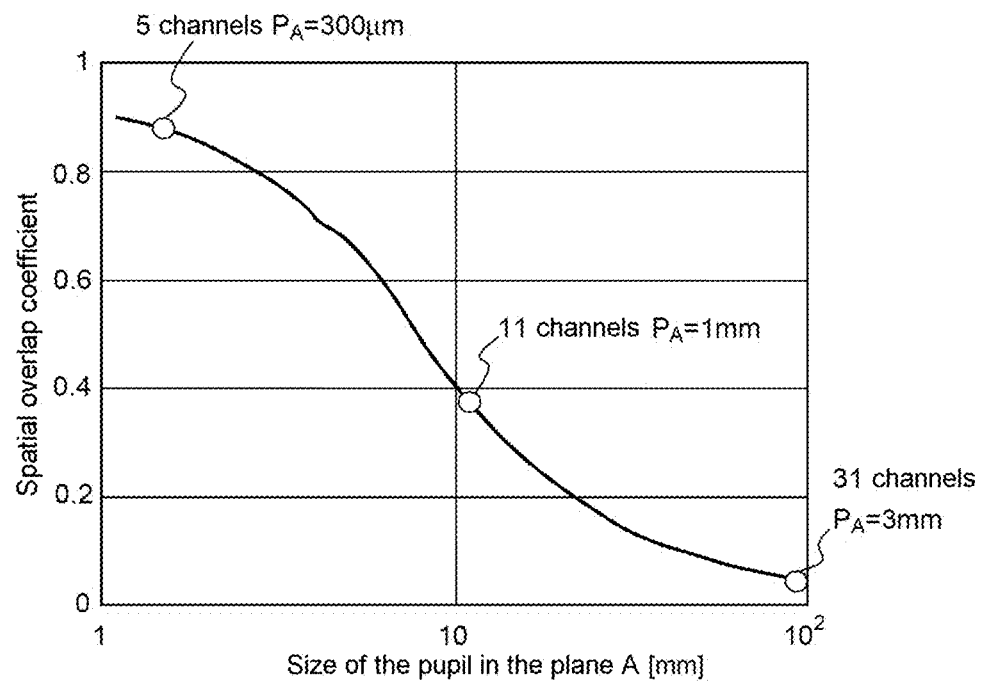

When the system is aimed at recombining pulse laser sources, with a pulse width of typically less than 1 picosecond, two difficulties occur in setting up the recombining system with a DOE such as described in FIG. 2a-2c:

The first difficulty is related to the spectral width of the pulses (typically of the order of Δλ=10 nm for Δt~100·10-15 s). The diffractive element 1 is specified and produced for a given operating wavelength. However, a spectral width of the order of 10 nm does not substantially affect the efficiency of recombination of the DOE (typically an efficiency loss of a few % for a spectral width of 10 nm). The angular dispersion δθ0 of the DOE is on the other hand more problematic (the blue component of the spectrum of the pulse will exit the DOE with a different angle from the red component, as illustrated in FIG. 2a).

This effect is on the one hand detrimental to the spatial quality of the recombined beam by increasing its divergence and on the other hand degrades the spatial dispersion of the beam and temporally widens the pulse.

Figure 1A:
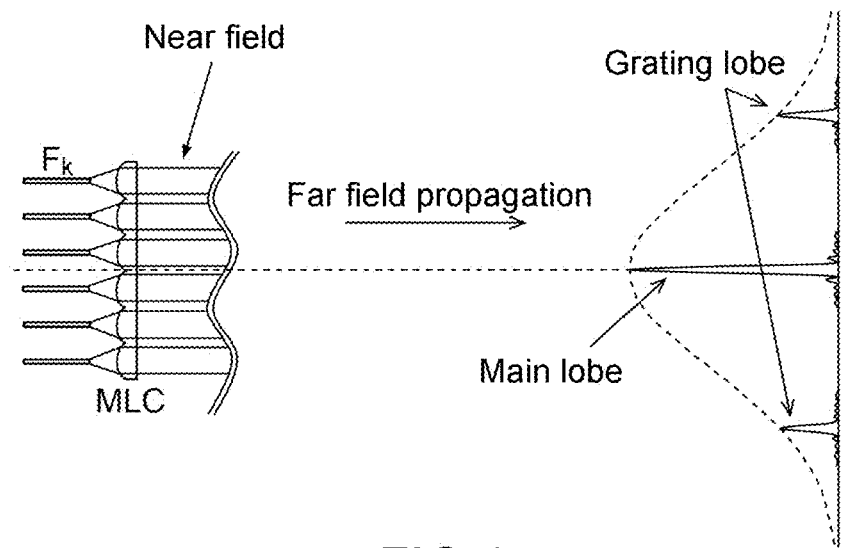
FIG. 1a-1c already described schematically represent systems for the spatial recombining of coherent beams in the near field (FIG. 1a), in the far field (FIG. 1b) and by a diffractive element (FIG. 1c), FIGS. 2a-2c schematically illustrate the problems posed by a system for the spatial recombining of coherent beams by a diffractive element: the chromatic dispersion (FIG. 2a), the defect of spatial overlap (FIG. 2b), as well as an exemplary curve of the overlap coefficient as a function of the size of the pupil (FIG. 2c), FIG. 3 schematically illustrates the conditions fulfilled by a system for the spatial recombining of coherent beams by a diffractive element according to the invention, FIG. 4 schematically represents an exemplary system for the spatial recombining of coherent beams by a diffractive element according to the invention, FIGS. 5a-5c schematically represent for a single source, the principle (FIG. 5a) of chromatic dispersion compensation and of optimization of the spatial overlap by a system for the spatial recombining of beams according to the invention, a more detailed view at the level of a compensating DOE illustrating the inclination of the spatial distribution of the pulse on passing through a compensating DOE (FIG. 5b), and the corresponding geometric construction illustrating the geometric construction of the grating vector $\vec{K}_{k,1}$ of the compensating DOE as a function of the angles of incidence and of inclination of the grating, and of the incident wave vector $\vec{K}_{i,1}$ (FIG. 5c), FIGS. 6a and 6b schematically illustrate the graphical determination of the angles of diffraction on a compensating DOE (FIG. 6a) and on the combining DOE (FIG. 6b) for two different wavelengths.
Figure 1B:
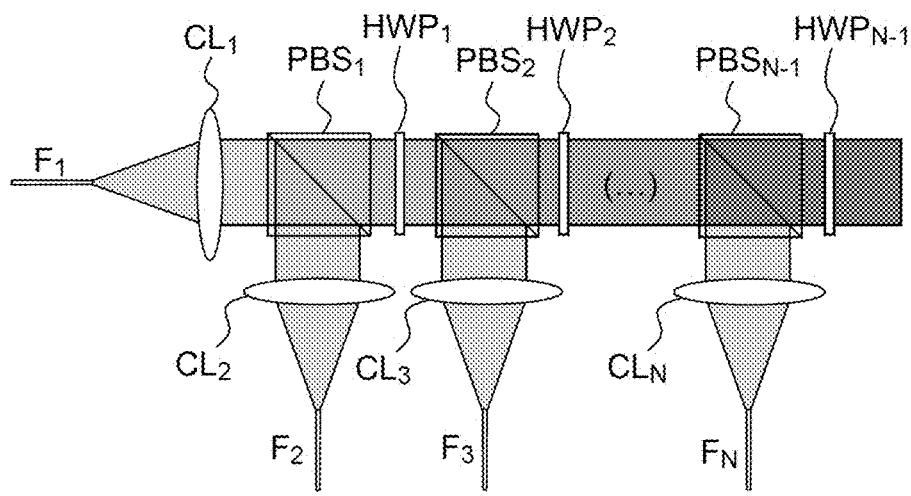
Figure 1C:
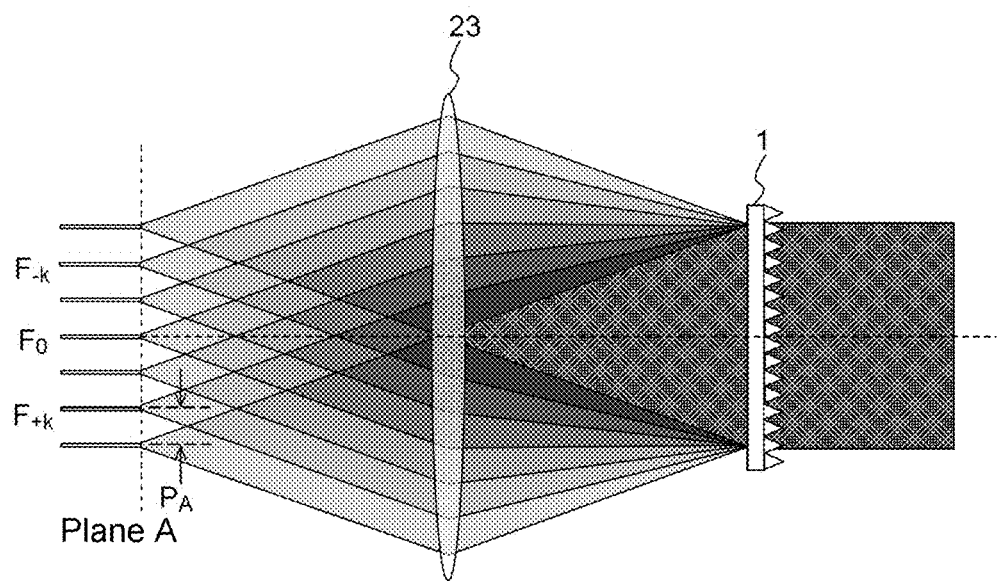

The second difficulty is related to the spatial overlap of short pulses having different angles of incidence on the DOE. This effect is illustrated in FIG. 2b and is related to the limited spatial extent of the pulses: limited to 2ω (at 1/e2) transversely to the direction of propagation of the light, and limited to c.Δt in the direction of propagation of the light (c the speed of light, and Δt the duration of the pulse). There is perfect overlap of the pulses for a zero angle between the directions of propagation, and an overlap which decreases as this angle increases. In the application illustrated in FIG. 1c for a numerical aperture equal to 1, the angle between the directions of propagation depends on the focal length of the Fourier lens 23 used, which is equal at the minimum to the size of the total pupil in the plane A i.e. the product of the number of channels (one-dimensional, or according to a diameter of the pattern of disposition of the laser sources) multiplied by the spacing between 2 consecutive sources in the plane A. FIG. 2c gives the coefficient of overlap between the pulses (of duration 300 10-15 s) calculated as a function of the size of the pupil in the plane A for the best value of focal length of the Fourier lens. This calculation clearly illustrate the impossibility of efficiently using the architecture such as shown in FIG. 1c in the short-pulse regime (<10-12 s) for a number of channels of typically greater than 10 (on one dimension).

Finally, a recombining system using an optical diffractive element DOE, which ensures the constructive interference of all the pulses along a single direction of propagation, and destructive along all others, could be an excellent candidate for recombining a large number of pulses, but it suffers from two major problems in the ultra-short pulse regime:

the problem related to the spectral width of the pulses, and the defect of spatial overlap of the pulses at the level of the DOE, on account of the distribution of the angles of incidence of the beams.

Figure 3:
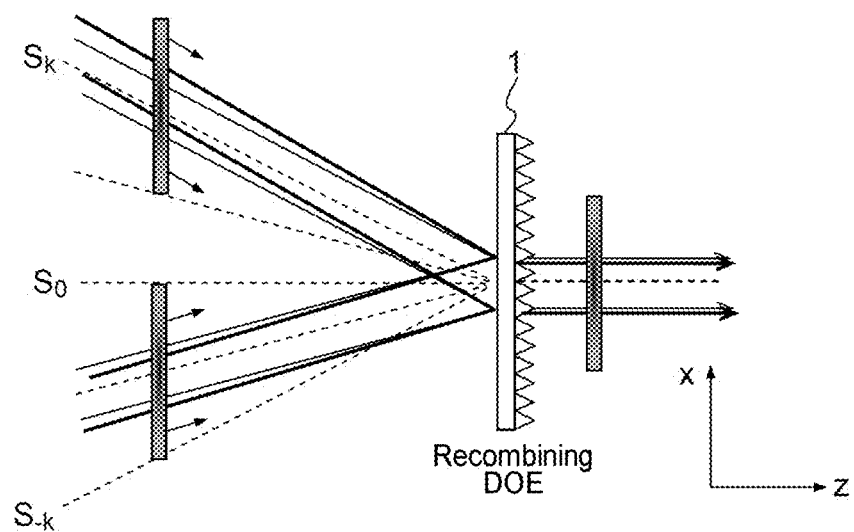

The system according to the invention comprises a compensating configuration, the technical effect of which is to realize the conditions illustrated in FIG. 3, that is to say:

on the one hand, the red and blue components of the spectrum of the pulse must arrive with different angles of incidence on the combining DOE 1, calculated in such a way that the wave vectors on exiting this combining DOE are all along the z axis of the figure, whatever the wavelength;

on the other hand, whatever the angle of incidence of the pulse on the combining DOE, the spatial distribution of energy at a set instant must be parallel to the combining DOE 1, i.e. parallel to the yOx plane of the figure, this being so as to optimize the spatial overlap of the pulses on the combining DOE.

This compensating configuration 2 is described in conjunction with FIGS. 4 and 5a, 5b and 5c.

Figure 5A:
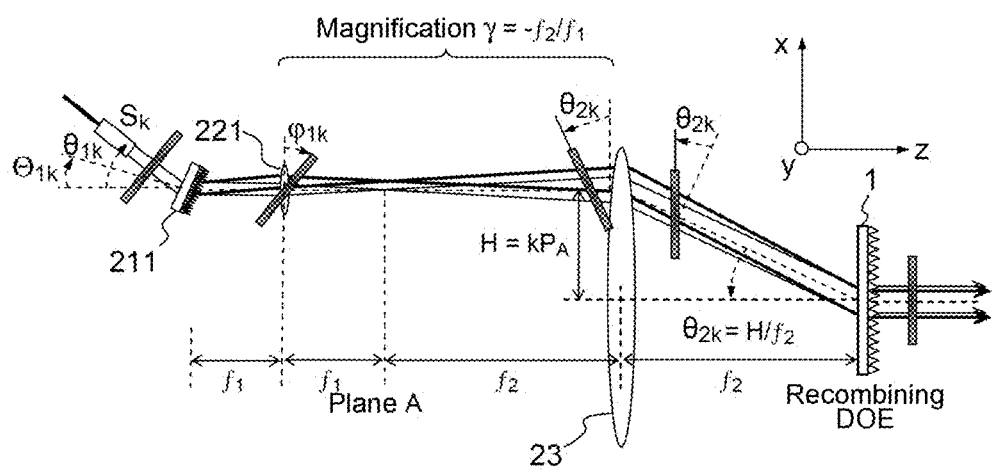

A first diffractive compensating assembly 21 is imaged on the combining DOE 1 by an imaging device. This imaging device comprises:

an array 22 of M lenses (one lens per beam) of focal lengths $f_1$ spaced apart by the spacing $P_A$, $P_A$ being the spatial period of the beams at $\lambda_0$ in the plane A, and the Fourier lens 23 of focal length $f_2$, and of aperture at least equal to $N \times f_1$, N being the number of laser sources (along the dimension represented in FIG. 5a).

This array 22 of lenses forms with the Fourier lens 23 a double-FT setup of predetermined magnification γ, able to image the diffractive optical compensating assembly 21 on the recombining diffractive optical element 1: the diffractive optical compensating assembly 21 is situated in the object plane of the array of lenses 22, the recombining DOE 1 being situated in the image plane of the Fourier lens 23, the image plane of the array of lenses 22 coinciding with the object plane of the Fourier lens 23.

This diffractive compensating assembly 21 is subdivided into N compensating DOEs also spaced apart by $P_A$, each compensating DOE 211 comprising a periodic phase and/or amplitude grating of spacing $\Lambda_{1k}$. The optical beams arising from the pulse laser sources $S_k$ are collimated upstream of the system (they are for example situated in a plane and collimated by a lens, or positioned directly according to their angle of incidence $\theta_{1k}$ with a collimating lens associated with each source), and each beam arrives with a specific angle $\theta_{1k}$ on the corresponding compensating DOE 211. Each spacing $\Lambda_{1k}$ is calculated as a function of the angle of incidence $\theta_{1k}$ of the beam on the corresponding compensating DOE and of the angle of inclination $\Theta_k$ of the compensating DOE on the z axis (we have $\Lambda_{1(k-1)} \neq \Lambda_{1k} \neq \Lambda_{1(k+1)}$, but $\Lambda_{1(-k)} = \Lambda_{1(+k)}$), so that at the central wavelength $\lambda_0$, all the laser beams are parallel on exiting the compensating DOEs, that is to say that at the central wavelength $\lambda_0$, the wave vectors $\vec{K}_{k,1}$ of the pulses exiting the compensating DOEs are all identical. The middles of these DOEs 211 are situated on one and the same plane situated at $f_1$ of the array 22 of lenses.

The Fourier lens 23 operates the Fourier transform from the plane A to the plane of the combining DOE 1; therefore the angles of incidences $\theta_{2k}$ of the pulses on the combining DOE are given by:

$$\theta_{2k} = k \cdot P_A / f_2.$$

As indicated in the preamble, these angles $\theta_{2k}$ are also related to the period of the grating of the combining DOE 1 so as to obtain the desired optimal combining.

As shown in FIG. 5a, so that the spatial distributions of energy of the incident pulses on the combining DOE 1 are parallel to the plane of the combining DOE (the plane xOy in the figure), the angle of inclination (in the plane xOz) of the energy distribution of the pulses before the lens 23 must equal $\theta_{2k}$. For optimal overlap of the pulses at the level of the combining DOE 1, the imaging device consisting of the array of lenses 22 and of the Fourier lens 23, of magnification $\gamma = -f_2/f_1$, then imposes the following condition on the angle of inclination of the spatial distributions of energy $\varphi_{1k}$ on exiting each compensating DOE 211:

$$\tan(\varphi_{1k}) = \gamma \tan(\theta_{2k})$$

Figure 5B:
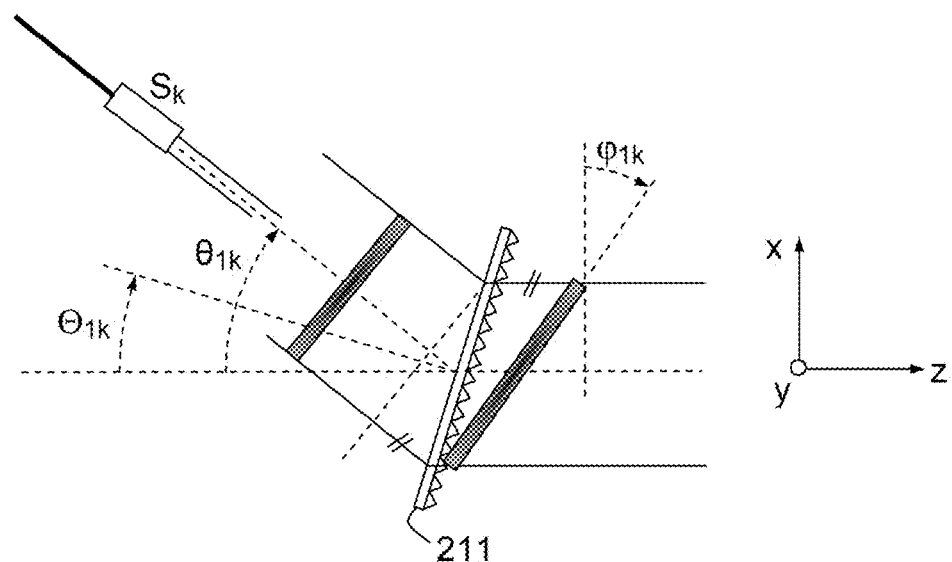
Figure 5C:
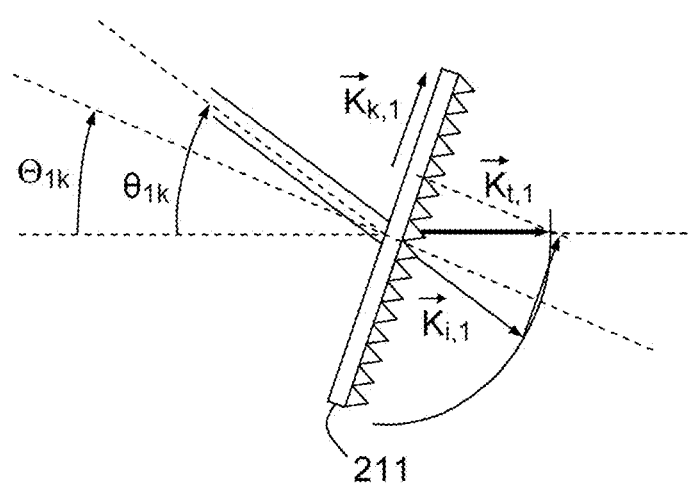

Moreover, it is considered that each compensating DOE 211 comprises a grating of uniform spacing $\Lambda_k$, and that its normal is inclined by an angle $\Theta_k$ with respect to the desired direction of propagation on exiting the DOE 211 (z axis in FIGS. 5a, 5b, 5c). The angle between the direction of incidence of the source $S_k$ and the desired direction of propagation on exit from the DOE is designated by $\theta_{1k}$. Finally $\varphi_{1k}$ designates the angle on exit from the compensating DOE 211, between the spatial distribution of energy of the pulse and the axis of propagation of the pulse. The wave vectors on entry to and on exit from the compensating DOE 211 are not parallel (except for the compensating DOE which is not inclined, that is to say such that: $\Theta_0 = 0$); the angles $\Theta_k$, $\theta_{1k}$ and $\varphi_{1k}$ are linked by:

$$\tan(\varphi_{1k}) = \frac{\sin(\theta_{1k} - \Theta_{1k})}{\cos(\Theta_{1k})} + \tan(\Theta_{1k})$$

Optimization of the spatial overlap of the pulses at the level of the combining DOE implies:

$$\frac{\sin(\theta_{1k} - \Theta_k)}{\cos(\Theta_k)} + \tan(\Theta_k) = \gamma \tan\left(k \frac{P_A}{f_2}\right) \quad 5$$

This giving a first relation between the parameters dimensioning the system:
the spatial period $P_A$ of the source points in the plane A,
the index k of the source,
the central wavelength of the pulses $\lambda_0$,
the magnification $\gamma$ of the imaging device,
the focal length $f_2$ of the Fourier lens 23.
Moreover, as illustrated in FIG. 5c, for each compensating DOE 211, the spacing $\Lambda_{1k}$ of its grating is established as a function of the direction of incidence $\theta_{1k}$, of the direction of inclination of the grating, and of the wavelength $\lambda_0$ by:

$$\Lambda_{1k} = \frac{\lambda_0}{\sin(\theta_{1k} - \Theta_k) + \sin(\Theta_k)}$$

Figure 4:
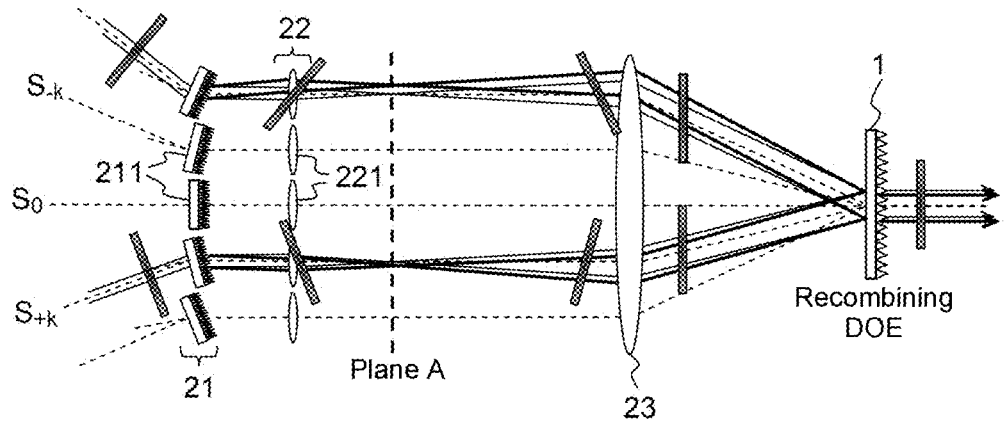

Finally, the optimization of the spatial overlap of the pulses at the level of the recombining DOE 1 is ensured by means of the system described in FIGS. 4 and 5a if the following relations between the parameters of the system are satisfied:

$$\begin{cases} \frac{\sin(\theta_{1k} - \Theta_k)}{\cos(\Theta_k)} + \tan(\Theta_k) = \gamma \tan\left(k \frac{P_A}{f_2}\right) \\ \Lambda_{1k} = \frac{\lambda_0}{\sin(\theta_{1k} - \Theta_k) + \sin(\Theta_k)} \end{cases}$$

i.e.:

$$\begin{cases} \frac{\sin(\theta_{1k} - \Theta_k)}{\cos(\Theta_k)} + \tan(\Theta_k) = \gamma \tan\left(k \frac{P_A}{f_2}\right) \\ \Lambda_{1k} = \frac{\lambda_0}{\gamma \tan\left(k \frac{P_A}{f_2}\right) \cos(\Theta_k)} \end{cases}$$

Compensation of the chromatic dispersion is now considered.

To a first approximation, the combining DOE is considered to be the superposition of N sinusoidal gratings (N being the number of beams to be combined), of spacing $\Lambda_{2k}$ given by:

$$\Lambda_{2k} = \frac{\lambda_0}{\sin(\theta_{2k})}$$

The period of the grating of the combining DOE is therefore equal to:

$\lambda_0/\sin \theta_{2k}$.

With $\theta_{2k}$ the angle of incidence of the beam of index k on the combining DOE 1, at the central wavelength $\lambda_0$. To deal with the compensation of the chromatic dispersion for the beam indexed k, only the grating indexed k is considered. A beam is considered at a wavelength $\lambda_0 + \delta\lambda_0$ incident on the combining DOE 1 with an angle $\theta_{2k} + \delta\theta_{2k}$. As illustrated in FIG. 6b, in order for the beams diffracted by the DOE 1 at $\lambda_0$ and at $\lambda_0 + \delta\lambda_0$ to have parallel directions of propagation (or wave vectors), conservation of the component tangential to the plane of the DOE of the wave vector implies:

$$\delta\theta_{2k} = \frac{\delta\lambda}{\lambda_0} \tan(\theta_{2k})$$

The chromatic dispersion of the combining DOE 1 is therefore equal to:

$$\frac{\partial \theta_{2k}}{\partial \lambda} = \frac{\tan(\theta_{2k})}{\lambda_0}$$

Likewise, for the compensating DOE 211, it was seen that the spacing of the compensation grating $\Lambda_{1k}$ is established as a function of the direction of incidence $\theta_{1k}$, of the direction of inclination of the grating, and of the wavelength $\lambda_0$ by:

$$\Lambda_{1k} = \frac{\lambda_0}{\sin(\theta_{1k} - \Theta_k) + \sin(\Theta_k)}$$

Figure 6A:
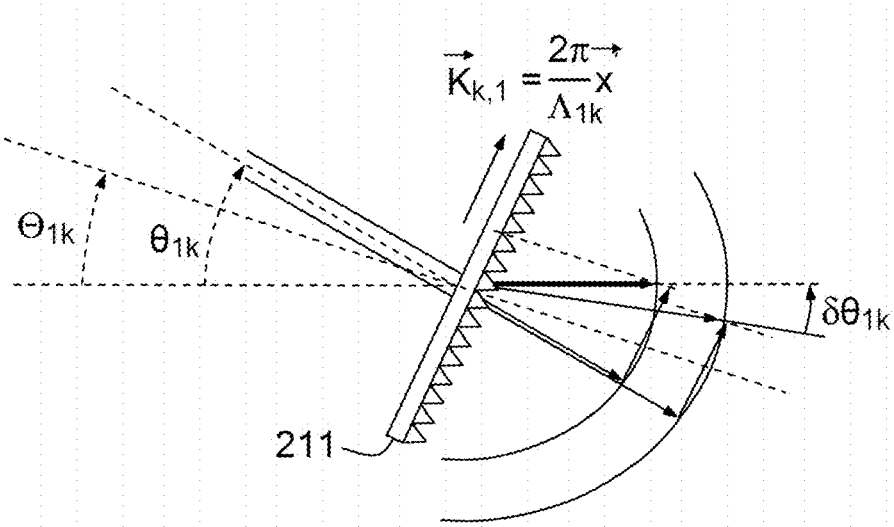
Figure 6B:
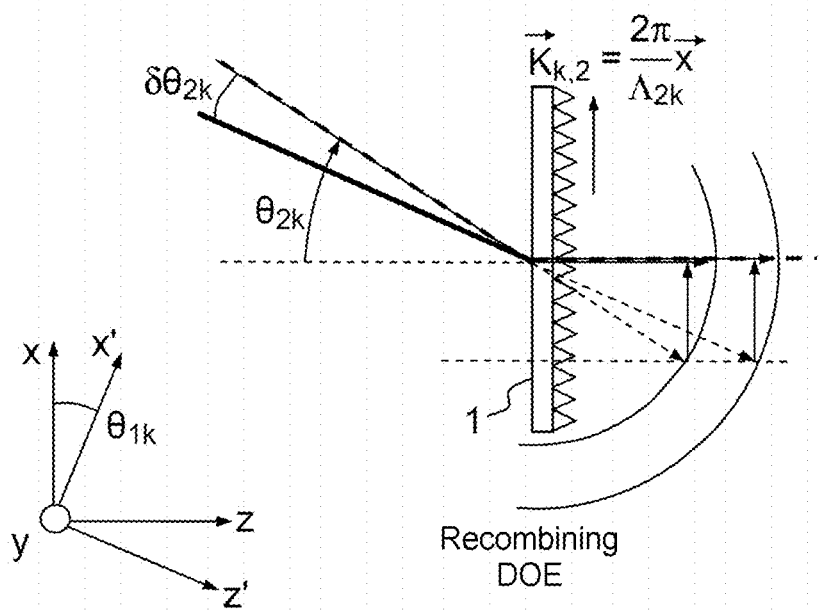

Calculation of the angular disparity $\delta\theta_{1k}$ between the wave vectors diffracted by the compensating DOE 211 at the wavelengths $\lambda_0$ and at $\lambda_0 + \delta\lambda_0$ and illustrated in FIG. 6a gives:

$$\delta\theta_{1k} = \frac{\delta\lambda}{\lambda_0}\left(\tan(\Theta_k) + \frac{\sin(\theta_{1k})}{\cos\Theta_k}\right)$$

The angular dispersion of the compensating DOE 211 is therefore equal to:

$$\frac{\partial \theta_{1k}}{\partial \lambda} = \frac{1}{\lambda_0}\left(\tan(\Theta_k) + \frac{\sin(\theta_{1k})}{\cos\Theta_k}\right)$$

The chromatic compensation condition is deduced from the calculation of the angular magnification of the off-centered imaging device of transverse magnification $\gamma$ such as that of the system described in FIG. 5a. The following condition is therefore obtained:

$$\frac{\partial \theta_{2k}}{\partial \lambda} = \frac{1}{\gamma(1 + \tan^2(\theta_{2k}))} \frac{\partial \theta_{1k}}{\partial \lambda}$$

Finally, compensation of the chromatic dispersion of the combining DOE 1 is ensured by means of the device described in FIGS. 4 and 5a if the following relations are satisfied:

$$\Lambda_{1k} = \frac{\lambda_0}{\sin(\theta_{1k} - \Theta_k) + \sin(\Theta_k)}$$

$$\gamma \tan\left(k\frac{P_A}{f_2}\right)\left(1 + \tan^2\left(k\frac{P_A}{f_2}\right)\right) = \tan(\Theta_k) + \frac{\sin(\theta_{1k})}{\cos(\Theta_k)}$$

According to the conditions established in the previous sections, simultaneous compensation of the chromatic dispersion of the combining DOE 1 and of the defect of spatial overlap of the pulses at the level of the combining DOE 1 is ensured by means of the device described in FIGS. 4 and 5*a* if the following relations are satisfied:

$$\begin{cases} \Lambda_{1k} = \dfrac{\lambda_0}{\sin(\theta_{1k} - \Theta_k) + \sin(\Theta_k)} \\ \gamma\tan\left(k\dfrac{P_A}{f_2}\right)\left(1 + \tan^2\left(k\dfrac{P_A}{f_2}\right)\right) = \tan(\Theta_k) + \dfrac{\sin(\theta_{1k})}{\cos(\Theta_k)} \\ \dfrac{\sin(\theta_{1k} - \Theta_k)}{\cos(\Theta_k)} + \tan(\Theta_k) = \gamma\tan\left(k\dfrac{P_A}{f_2}\right) \end{cases}$$

Let us consider the example of the following case:

One wishes to combine 101 ultra-short (300 ps) pulse sources disposed in line according to a period $P_A$ of 2 mm (NB: the following calculation is equivalent for a in 2-dimensional disposition with 101 sources on the largest diameter, i.e. 7651 sources in a hexagonal tiling).

The magnification of the imaging system is fixed at $\gamma=-5$.

The central wavelength equals $\lambda_0=1030$ nm.

Figure 7:
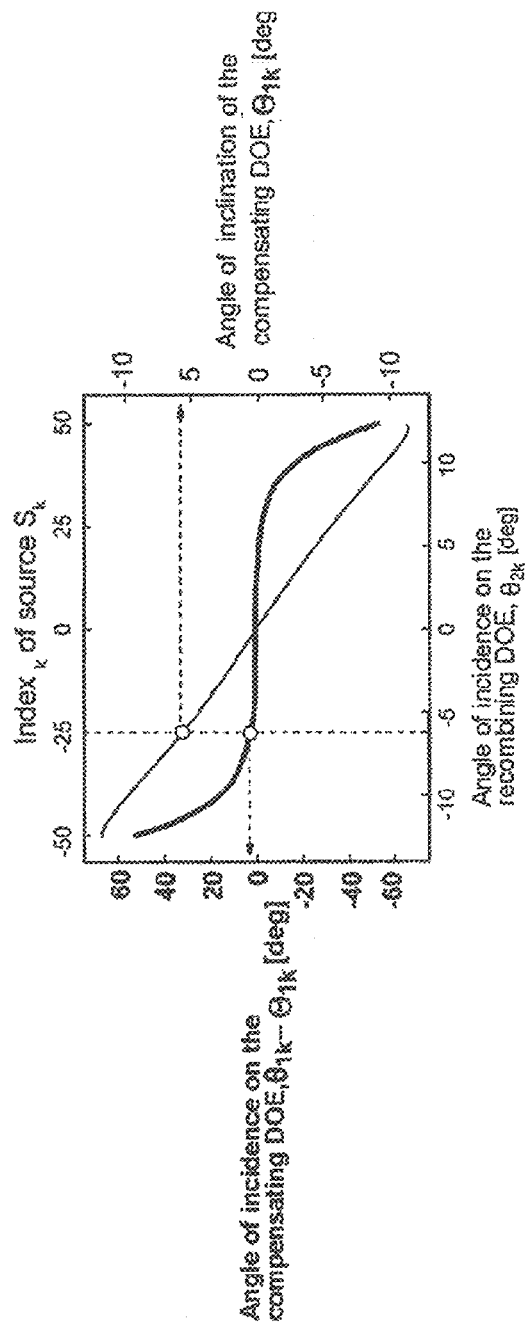
FIG. 7 illustrates an exemplary calculation of the angles of incidence and of inclination of the compensation gratings for optimization of the overlap of the pulses on the combining DOE and compensation of the chromatic dispersion.

FIG. 7 represents the values of angle of incidence $\theta_{1k}-\Theta_k$ on the compensating DOEs and the angles of inclination $\Theta_k$ of the compensating DOEs 211, which satisfy the above system, and therefore ensure simultaneous compensation of the effects of chromatic dispersion of the combining DOE 1 and the defect of spatial overlap of the pulses on the combining DOE.

Figure 8A:
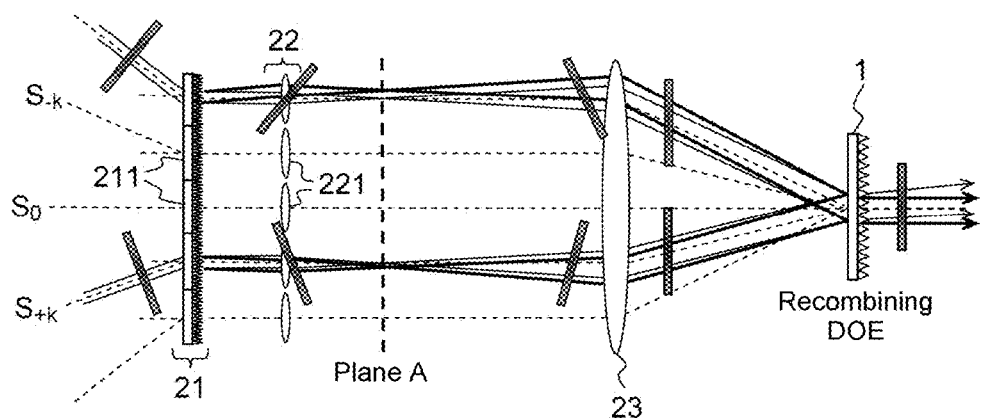
FIGS. 8a and 8b show two exemplary embodiments of a system for the spatial recombining of beams according to the invention, with compensating DOEs disposed in one and the same plane when the chromatic compensation (FIG. 8b) or the compensation of the overlap defect (FIG. 8a) is favored.
Figure 8B:
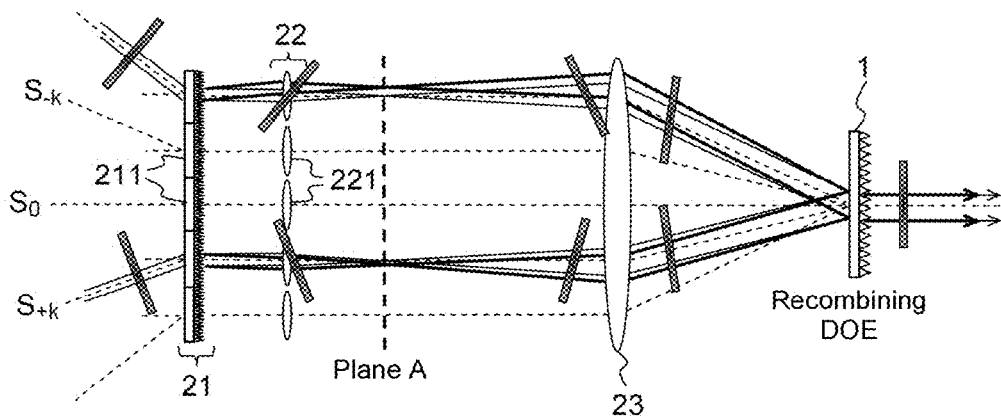

According to a particular embodiment of the invention an example of which is shown in FIGS. 8*a* and 8*b*, the compensating DOEs 211 are situated on one and the same plane, thereby simplifying the system and avoiding notably devices for orienting each DOE 211 which are bulky and increase the cost of the overall system. Such is the case when the gratings are for example fabricated on one and the same support, thus exhibiting advantages in terms of time and cost of fabrication. This is then manifested in the previous relations by zero angles of inclination $\Theta_k$ of the compensating DOEs: $\Theta_k=0$.

Figure 9:
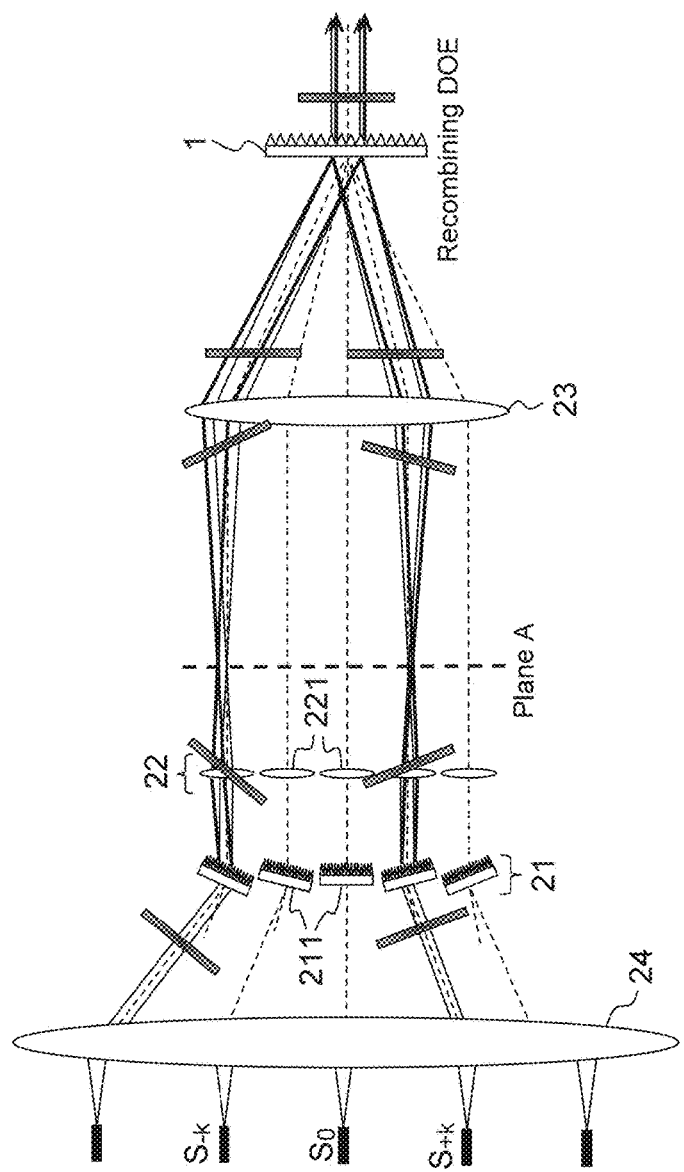
FIG. 9 shows a third exemplary embodiment of a system for the spatial recombining of beams according to the invention, with another Fourier lens.

Then for each compensating DOE 211, the angle of incidence $\theta_{1k}$ of the beam is such that:

$\gamma\cdot\tan(k\,PA/f2)=\sin(\theta 1k)$, when one wishes to favor compensation of the defect of overlap of the recombined pulses to the detriment of chromatic compensation (FIG. 8*a*), or $\gamma\cdot\tan(k\,PA/f2)(1+\tan(k\,PA/f2)2)=\sin(\theta 1k)$, when one wishes to favor chromatic compensation of the recombined pulses to the detriment of compensation of the overlap defect (FIG. 8*b*). According to another embodiment of the invention (FIG. 9), the beams arising from the laser sources have one and the same exit plane, and the system comprises another Fourier lens 24 having an object plane in which the exit plane of the laser sources is situated.

The gratings of the compensating DOEs are advantageously blazed phase gratings. Alternatively, they may be phase gratings with sinusoidal continuous profile, with binary profile, or intensity gratings with binary profile (black and white) or ne gray levels. All these examples, except blazed gratings, exhibit multiple diffraction orders and therefore penalize the overall efficiency of the system.

In the examples of the figures, the combining DOE 1 and compensating DOE 211 operate in transmission; the principle of the system according to the invention remains valid when using DOEs in reflection.

The invention claimed is:

1. A system for the spatial recombining of pulse laser beams of the same wavelength centered around $\lambda_0$, arising from N synchronized sources k, k varying from 1 to N, N being an integer >1, which has an optical axis and comprises:

a Fourier lens of focal length $f_2$, of predefined object plane and predefined image plane, the laser beams exhibiting at $\lambda_0$ a periodic spatial configuration of spacing $P_A$ in the object plane (plane A), a recombining diffractive optical element with periodic phase profile, on which the N beams are intended to be directed by the Fourier lens according to an angle of incidence $\theta_{2k}$ that differs from one beam to the next, these angles of incidence being determined as a function of the period of the recombining diffractive optical element, wherein the sources are able to emit pulses of duration less than $10^{-12}$ s, and comprising:

N compensating diffractive optical elements with periodic grating with one compensating diffractive optical element per source, an angle of incidence $\theta_{1k}$ that differs from one beam to the next, and a grating spacing $\Lambda_{1k}$ that differs between neighboring compensating diffractive optical elements, an array of lenses with one lens per source, of predefined object plane and predefined image plane, forming with the Fourier lens a double-FT setup of predetermined magnification $\gamma$, able to image each compensating diffractive optical element on the recombining diffractive optical element, the compensating diffractive optical elements being situated in the object plane of the array of lenses, the recombining diffractive optical element being situated in the image plane of the Fourier lens, the image plane of the array of lenses coinciding with the object plane of the Fourier lens, and wherein for each compensating diffractive optical element, the angle of incidence $\theta_{1k}$ of the beam on the compensating diffractive optical element, an angle of inclination $\Theta_k$ of the compensating diffractive optical element on the optical axis, and the spacing $\Lambda_{1k}$ of its grating, are determined on the basis of $$\begin{cases} \Lambda_{1k} = \dfrac{\lambda_0}{\sin(\theta_{1k} - \Theta_k) + \sin(\Theta_k)} \\ \gamma\tan\left(k\dfrac{P_A}{f_2}\right)\left(1 + \tan^2\left(k\dfrac{P_A}{f_2}\right)\right) = \tan(\Theta_k) + \dfrac{\sin(\theta_{1k})}{\cos(\Theta_k)} \\ \dfrac{\sin(\theta_{1k} - \Theta_k)}{\cos(\Theta_k)} + \tan(\Theta_k) = \gamma\tan\left(k\dfrac{P_A}{f_2}\right) \end{cases}.$$

2. The spatial recombining system as claimed in claim 1, wherein the angles of inclination $\Theta_k$ of the compensating diffractive optical elements are zero, and in that they are situated in one and the same plane.

3. The spatial recombining system as claimed in claim 2, wherein for each compensating diffractive optical element, the angle of incidence $\theta_{1k}$ of the beam is such that:

$\gamma\cdot\tan(k\,P_A\,/f_2)=\sin(\theta_{1k})$.

4. The spatial recombining system as claimed in claim 2, wherein for each compensating diffractive optical element, the angle of incidence $\theta_{1k}$ of the beam is such that:

$\gamma\cdot\tan(k\,P_A\,/f_2)(1+\tan(k\,P_A\,/f_2)^2)=\sin(\theta_{1k})$.

5. The spatial recombining system as claimed in claim 1, wherein the sources are disposed according to a one-dimensional or two-dimensional spatial configuration.

6. The spatial recombining system as claimed in claim 5, wherein the beams arising from the laser sources having one and the same exit plane, the spatial recombining system further comprising another Fourier lens that differs from the Fourier lens, the other Fourier lens having an object plane in which the exit plane of the laser sources is situated.

7. The spatial recombining system as claimed in claim 1, wherein N>100.

8. The spatial recombining system as claimed in claim 1, wherein the gratings of the compensating diffractive optical elements are blazed gratings.

* * * * *